(12) United States Patent
Kuwayama (10) Patent No.: US 6,449,810 B1
(45) Date of Patent: Sep. 17, 2002

(54) STOPPER FOR JEWELRY STRANDS

(75) Inventor: Yukihiro Kuwayama, Tokyo (JP)

(73) Assignee: Kabushiki Kaisha Kuwayama, Tokyo (JP)

( * ) Notice: Subject to any disclaimer, the term of this patent is extended or adjusted under 35 U.S.C. 154(b) by 0 days.

(21) Appl. No.: 09/904,213

(22) Filed: Jul. 12, 2001

(30) Foreign Application Priority Data

Mar. 29, 2001 (JP) .......................................... 2001-95357

(51) Int. Cl.[7] .......................... A41D 25/14; A44B 21/00; A44C 5/00; F16G 11/14
(52) U.S. Cl. ..................... 24/115 H; 24/66.9; 24/66.11; 24/71 J; 24/115 G
(58) Field of Search ........................... 24/115 H, 115 G, 24/66.9, 66.11, 66.13, 68 J, 70 J, 71 J, 265 WS, 583

(56) References Cited

U.S. PATENT DOCUMENTS

| | | | | |
|---|---|---|---|---|
| 2,861,313 A | * | 11/1958 | Ruf | ........................ 24/115 H |
| 4,912,814 A | * | 4/1990 | McKenzie | ................ 24/115 H |
| 5,008,981 A | * | 4/1991 | Smithson | .................. 24/115 G |
| 5,697,128 A | * | 12/1997 | Peregrine | ................. 24/115 G |
| 6,202,443 B1 | * | 3/2001 | Grosser-Samuels | ....... 24/115 G |

FOREIGN PATENT DOCUMENTS

| | | | | |
|---|---|---|---|---|
| FR | 1276059 | * | 10/1961 | ................ 24/115 G |
| GB | 2131868 | * | 6/1984 | ................ 24/115 G |
| JP | 7313218 | * | 12/1995 | ................ 24/115 G |
| JP | 1042917 | * | 2/1998 | ................ 24/115 H |
| JP | 1170009 | * | 3/1999 | ................ 24/115 G |

* cited by examiner

Primary Examiner—Victor Sakran
(74) Attorney, Agent, or Firm—Pyle & Piontek (57) ABSTRACT

A stopper to adjust the contained length of a flexible jewelry strand such as a chain or a string is disclosed. The body of the stopper includes two side portions held in a spaced relationship by a central hub having at least one aperture through which at least one end of the strand is passed. A pair of resilient rings are provided in the groove of between the side portions to prevent the strand from slipping.

7 Claims, 9 Drawing Sheets

STOPPER FOR JEWELRY STRANDS

BACKGROUND

The present invention to a stopper for accessories for tightening accessory chains or string elements, especially such as necklaces, bracelets and the like.

A variety of stoppers for holding an accessory chain or a string element, herein referred to as flexible strands, have been proposed.

For example, one proposal is to provide a type of personal ornament wherein a portion of a necklace is attached to a body of the stopper formed in a spherical shape of wax and having an insertion hole provided on the body of the spherical stopper, with silicon rubber put in the insertion hole, and a portion of the necklace being inserted in the insertion hole for releasably holding the necklace with silicon rubber. However, in this type of stopper, it is difficult to attach jewels such as diamonds, because the body of the stopper is of a thinly formed in thickness, resulting in inconvenience.

In addition, as described above, because this type of stopper is structured by providing an insertion on the spherically formed body of the stopper with silicon rubber put in the insertion hole and an end portion of the necklace is inserted in the insertion hole for holding the middle portion of the necklace with the silicon rubber, the structure makes it difficult to replace silicon rubber with ease, resulting in inconvenience when the rubber is missing or damaged.

SUMMARY OF THE INVENTION

The present invention solves the above problem by providing stopper that enables releasibly fastening the flexible strand, such that the stopper becomes a valuable accessory, thereby making the necklace and the bracelet more valuable, while lowering the price of the product and making repair work easier.

In one preferred embodiment, the accessory-chain/string stopper is characterized in that the accessory-chain/string element stopper comprises a first decoration side portion, a second decoration side portion spaced from the first decoration side portion, a central body portion with an end of the body connected to said first side portion, and another end connected to the second side portion, an aperture through the central body portion to enable an accessory chain or a string element to be inserted therethrough, and a first ring-like elastic element and a second ring-like elastic element formed from an elastic material provided around said body each of which is held between said first side portion and said second side portion.

The stopper assembly for jewelry use is especially characterized as comprising a pair of dome-shaped side elements and a central hub connecting the elements and defining circular or other shaped groove between the side elements surrounding the hub. At least one aperture is provided through the hub, with the aperture having a diameter larger than the diameter of the flexible strand, enabling the passage of at least one end of the strand through the aperture. At least one and preferably two elastomeric washers having central openings are installed within the groove in order to releasably retain the strand from longitudinal movement while allowing adjustments by pulling on the strand near the stopper. In the preferred embodiment, the outer diameter of the washer(s) is coextensive with the outer diameter of side elements or has a diameter less than the side elements. The flexible or elastic washers may be press fitted into the groove on either side of the aperture and strand, with the washers under compression with each other.

DETAILED DESCRIPTION

The first embodiment of the present invention for an accessory-chain and string element stopper is shown in FIG. 1 through FIG. 6. This embodiment shows an accessory stopper comprising of an accessory-chain/string stopper applied to a necklace formed by a chain or line flexible strand.

Figure 1:
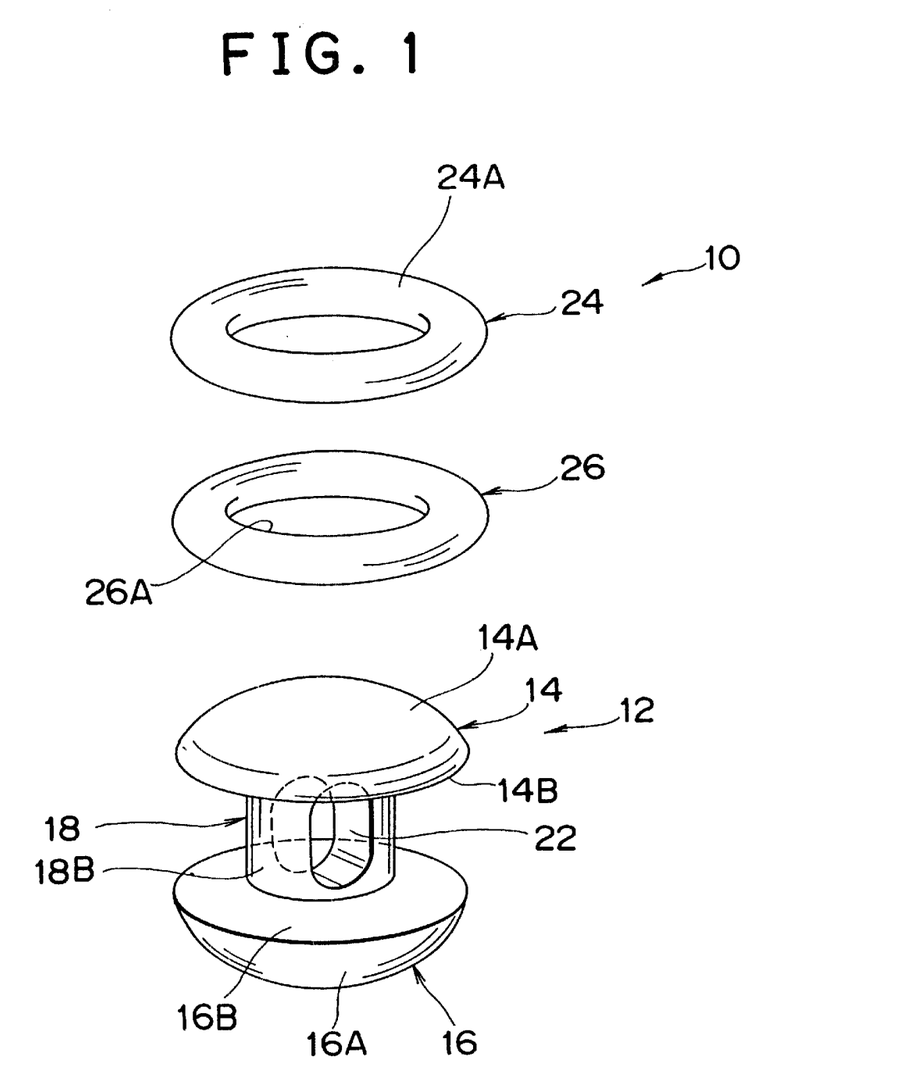
FIG. 1 is a fractional diagonal view of the accessory-chain/string element stopper element of the first embodiment.

As shown in FIG. 1, a stopper body 12 of the accessory-chain/string element stopper 10 is uniformly formed by a metal such as a gold alloy, such that the stopper is of unitary construction. Both of the first decoration side portion 14 of the stopper body 12 and the second decoration side portion 16 are formed in disks and a peripheral outer side 14A and a peripheral outer side 16A are formed to have a convex or dome shape. Accordingly, the outer surfaces of the first decoration side portion 14 and the second decoration side portion 16 can hold jewelries (not shown) because the first decoration side portion 14 and the second decoration 16 portion are thickly formed.

Figure 2:
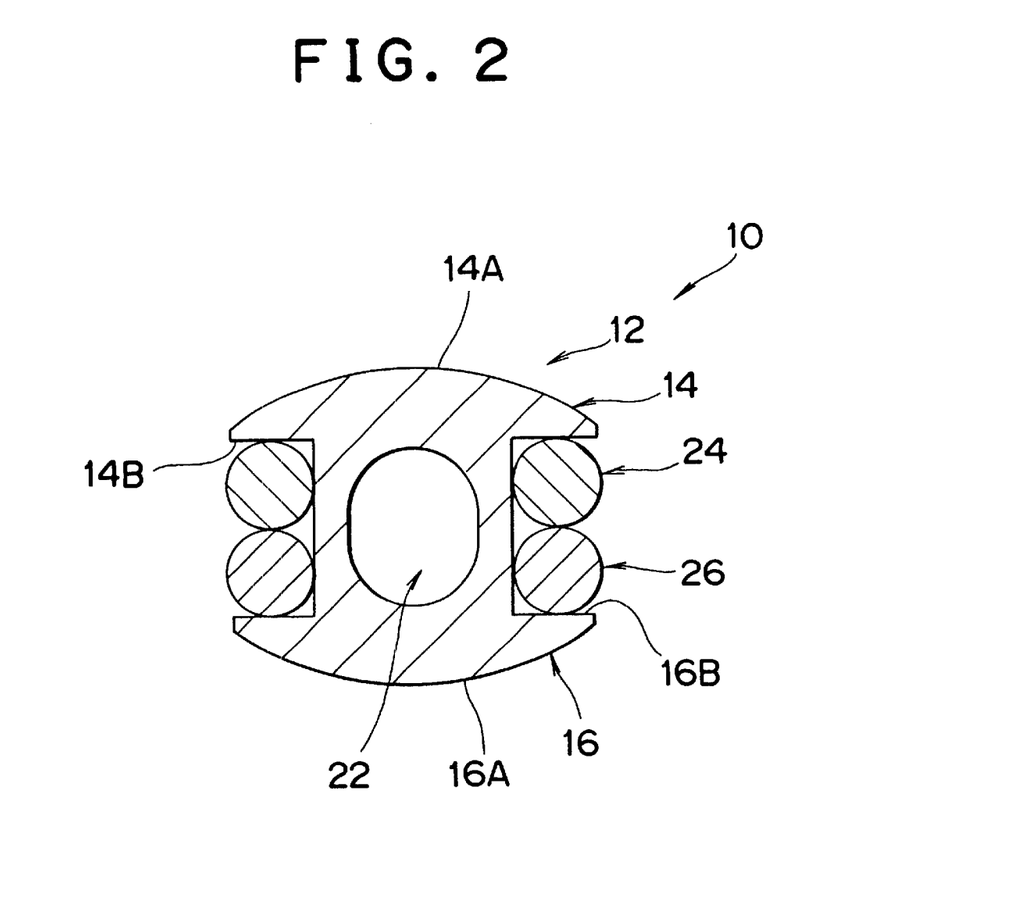
FIG. 2 is a vertical sectional view of the accessory-chain/string element stopper of the first embodiment.
Figure 3:
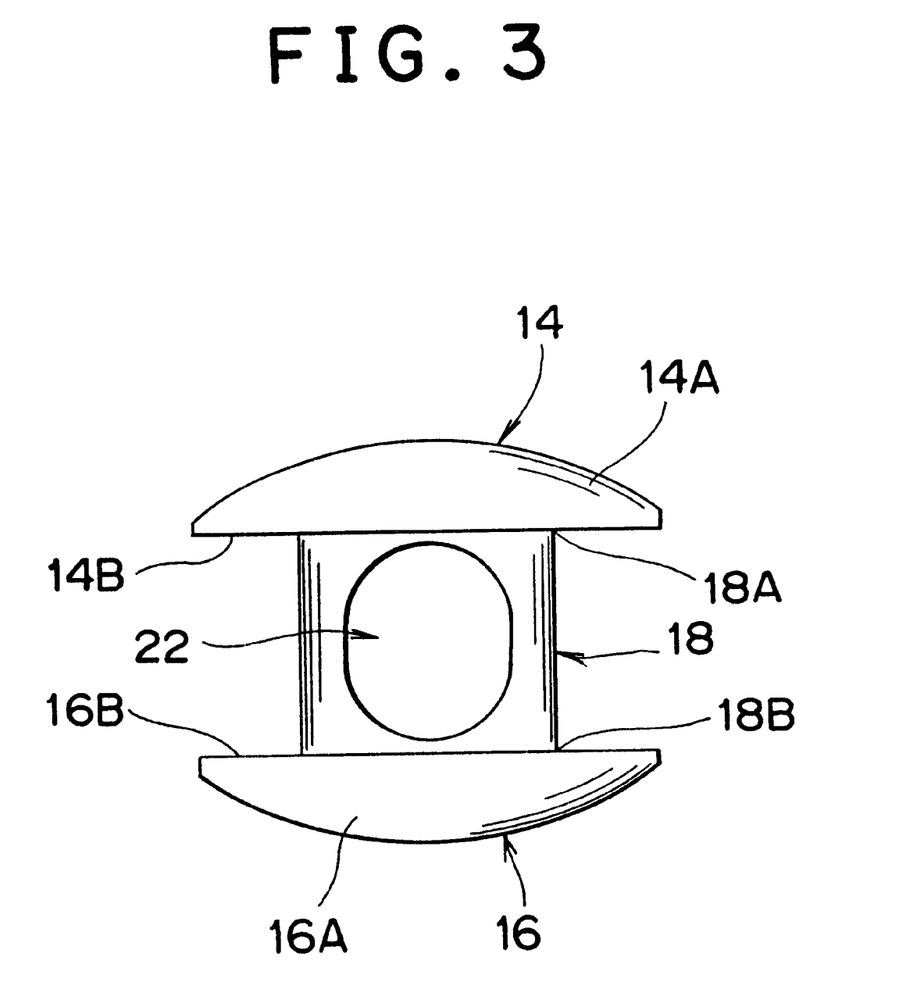
FIG. 3 is a front view of the accessory-chain/string element of the first embodiment.

As shown in FIG. 2 and FIG. 3, the first decoration side portion 14 and the second decoration side portion 16 are spaced apart in confrontation. A central body portion in a cylindrical shape 18 is provided between the flat inner surface 14B of the first decoration side portion 14 and the flat inner surface 16B of the second decoration side portion 16, and an end portion 18A of the body portion 18 is connected to the inner surface 14B of the first decoration side portion 14 while another end portion 18B of the body 18 is connected to the inner surface 16B of the second decoration side portion 16. The central body portion 18 has a substantially smaller diameter that the side portions such that a circular groove is established between the side portions.

An aperture 22 is provided through the body portion 18, allowing the necklace 20 (shown in FIG. 5), or other flexible strand, to extend therethrough. The aperture 22 is formed so that the hole is elliptic when viewed from the front, to allow passage of two strands.

Figure 5:
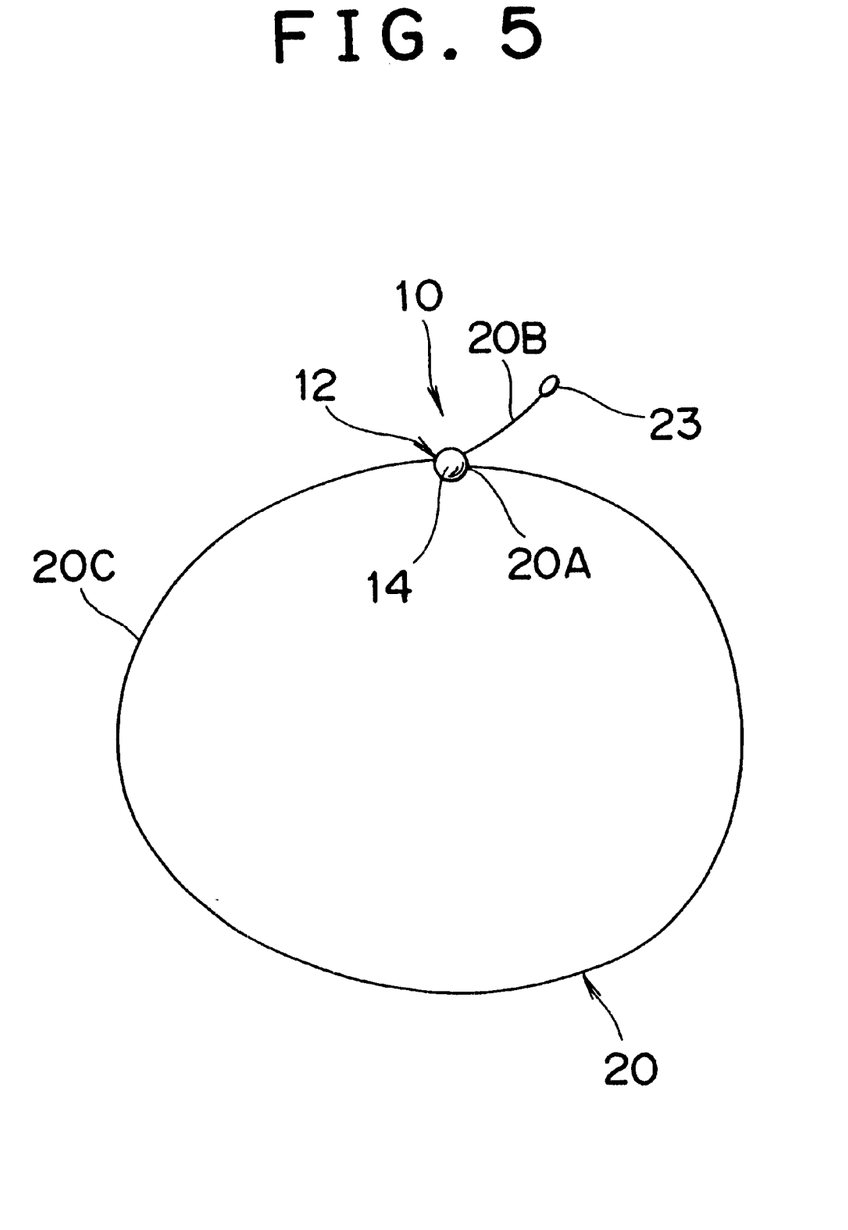
FIG. 5 is an overall view of the accessory-chain/string element stopper of the first embodiment showing a usage of the stopper and strand assembly.
Figure 6:
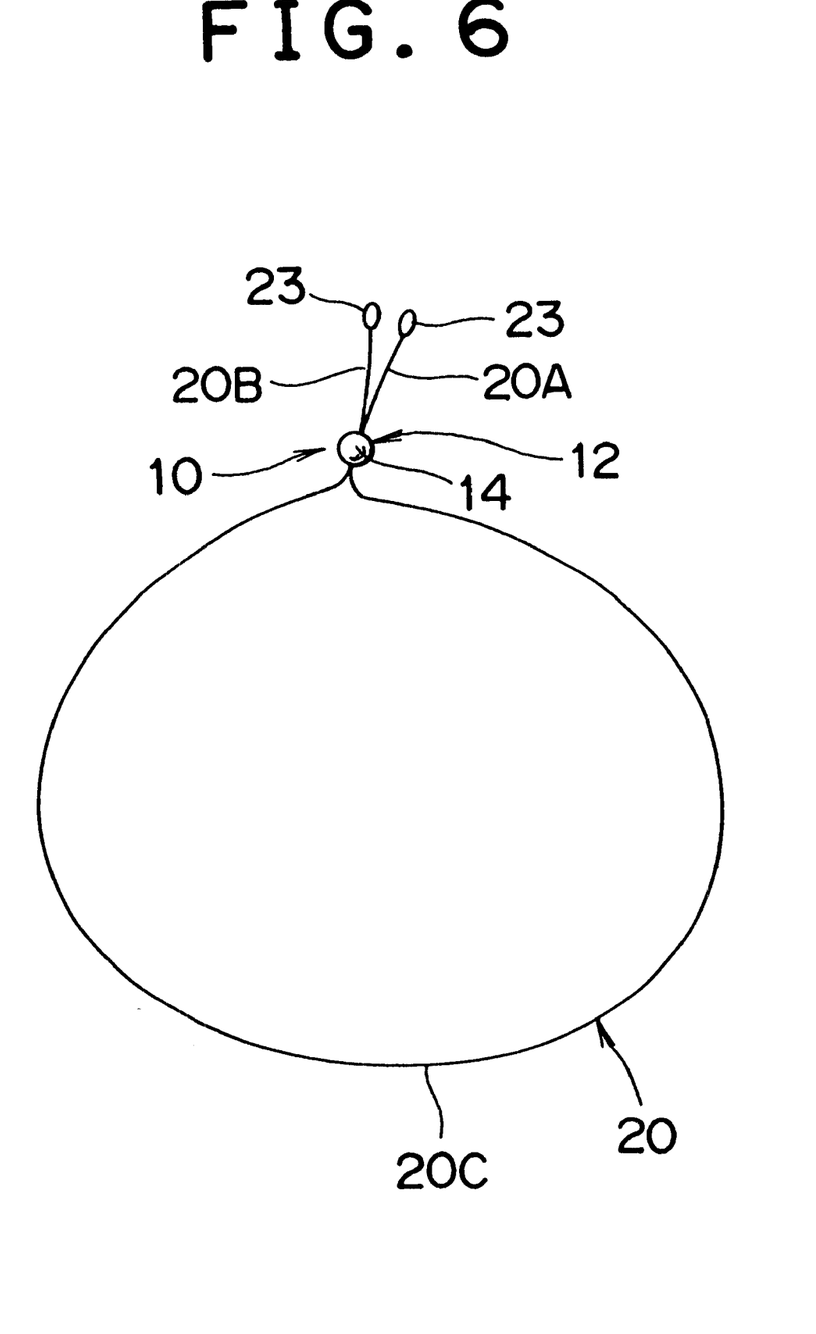
FIG. 6 is an overall view of the accessory-chain/string element stopper of the first embodiment showing another usage of the element.

As shown in FIG. 5, an end 20A of the necklace 20 is connected to the decoration side portion 14 with wax. In addition, a drop prevention element 23 having a larger diameter than the necklace 20 and smaller than the insertion through hole is provided and is fixed on another end 20B of the necklace 20.

As shown in FIG. 1 and FIG. 2, a first ring-like elastic element 24 and a second ring-like elastic element 26 are provided around body 18 with the elements held in the circular groove between the first side portion 14 and the second side portion 16. Both of the first ring-like elastic element 24 and the second ring-like elastic element 26 are formed from an elastic material, such as silicon rubber, and a circular aperture 24A in the first ring-like elastic body 24 and a circular aperture 26A in the second ring-like elastic element 26 are equal or smaller in outer diameters than the diameters of the first side portion 14 and the second side portion 16, preventing the ring-like elastic elements 24 and 26 from coming off accidentally.

Figure 4:
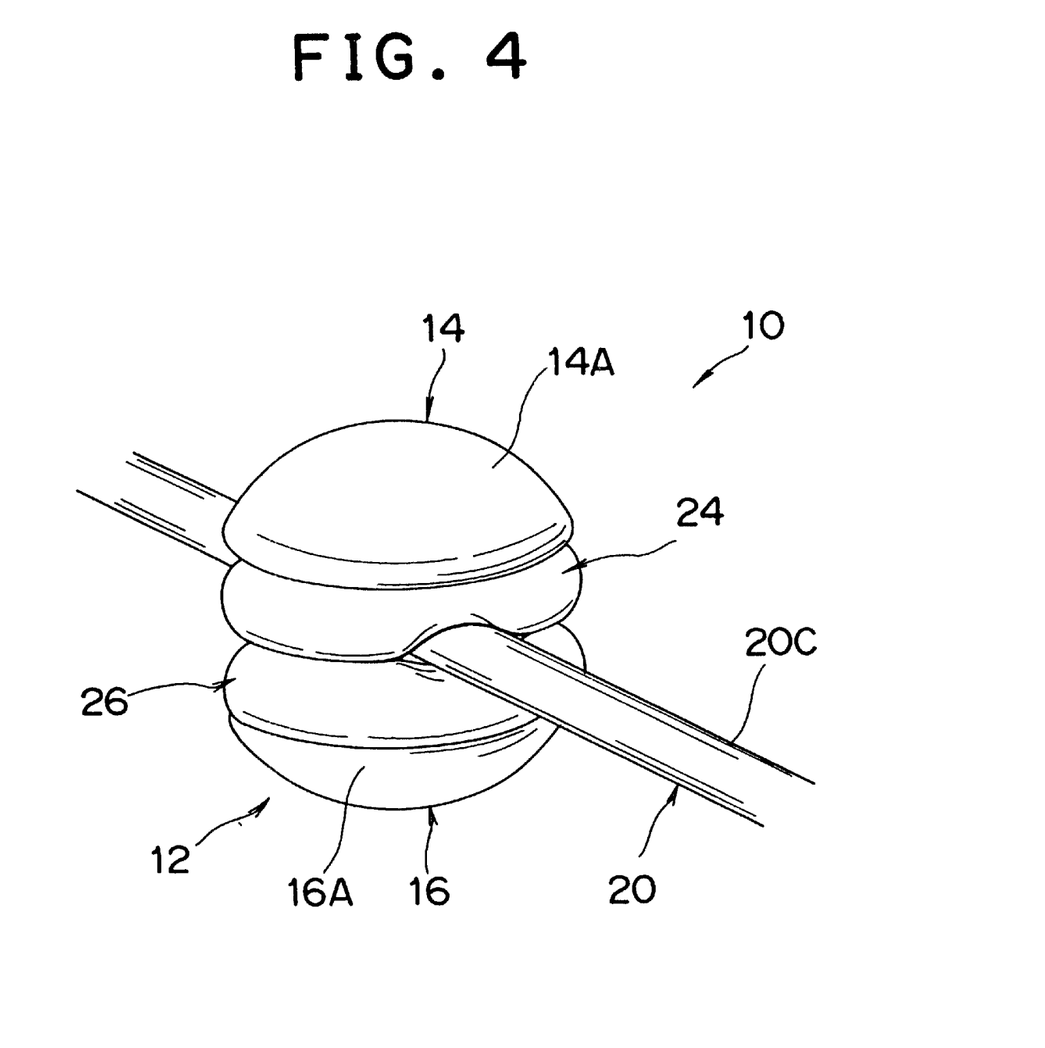
FIG. 4 is a magnified view of the accessory-chain/string element stopper of the first embodiment showing a usage of the stopper.

As shown in FIG. 4, the flexible strand 20 such as a chain or a string having a middle portion 20C may be extended through the aperture, followed by installation of the elastic rings 24 and 26 on each side of the strand in order to releasably clamp the strand. As shown, the two ring members resiliently engage each other upon installation in the circular groove.

As shown in FIG. 5, the one end 20B of the necklace 20 is extended through the insertion hole 22 and the first ring-like elastic element 24 and the second elastic element 26 and are installed in the circular groove between the side portions. As a result, as additionally shown in FIG. 4, the first ring-like elastic element 24 and the second ring-like elastic element 26 hold and tighten the middle portion 20C of the necklace 20 enabling the necklace to be put on.

In addition, because jewelries such as diamonds can be mounted on the first decoration side portion 14 and the second decoration side portion 16, the accessory-chain/strip element stopper 10 itself can be valuable as an accessory and the value of the product will be increased in combination with the necklace 20.

Furthermore, even in the case that the necklace 20 is put on around the neck, the middle 20C of the necklace 20 can be moved by pulling the necklace 20 with a strong force at the accessory-chain/string stopper 10, enabling easy adjustment of the length of the necklace after the necklace 20 is put on.

In case the ring members 24 and 26 become worn or damaged, they can be easily replaced at low cost. In addition, production costs are low in comparison with other proposed devices.

Furthermore, as shown in a preferred embodiment of FIG. 5, an end 20A of the necklace 20 may be connected to and fixed upon the first decoration side portion 14 with wax and the other end of the 20B of the necklace 20 may be inserted through the insertion hole 22. It is apparent that the first ring-like elastic element 24 and the second ring-like elastic element 26 may be used for tightening and fixing while an end 20A together with another end 20B of the necklace 20 is inserted through the insertion hole 22.

Figure 7:
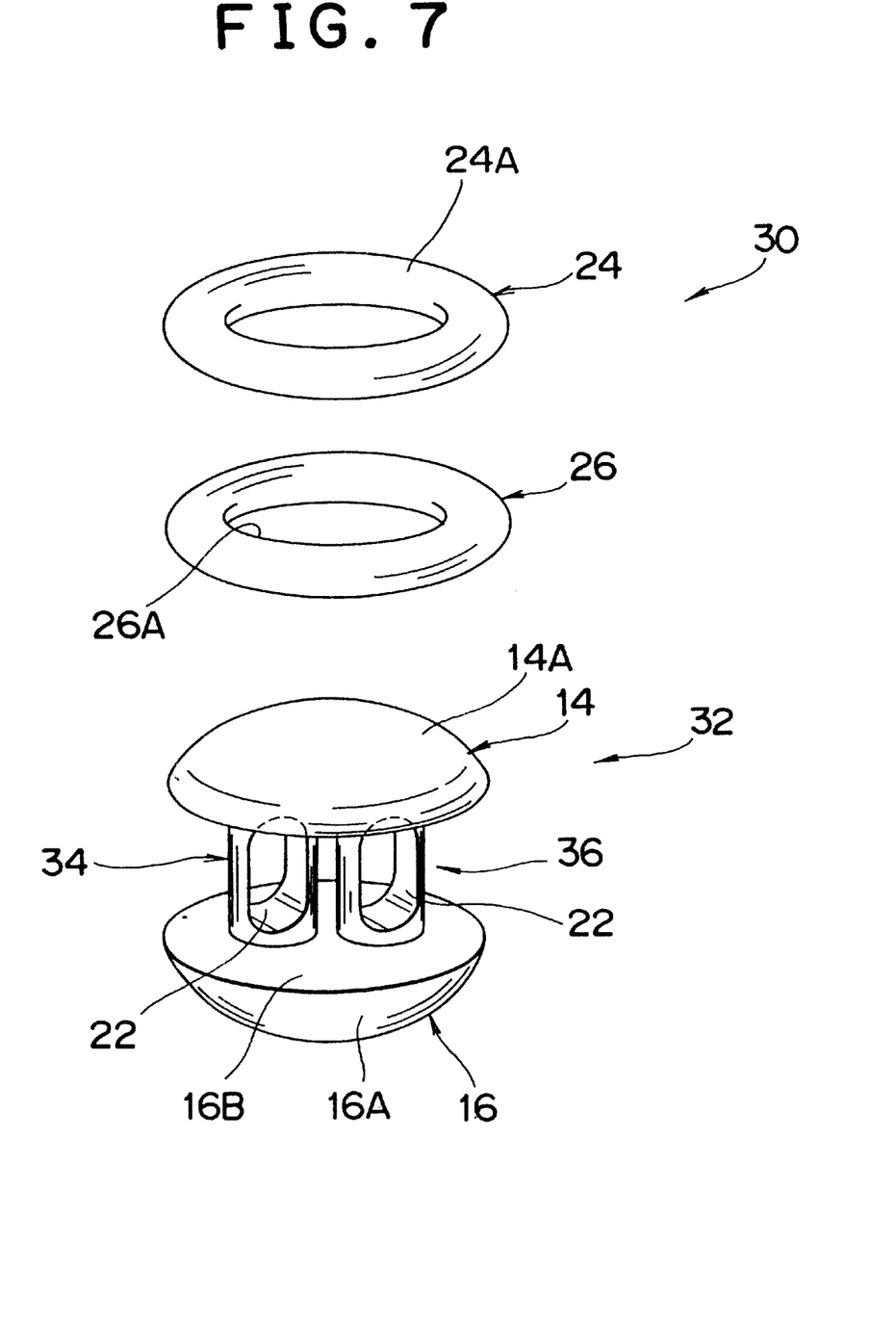
FIG. 7 is a fractional diagonal view of the accessory-chain/string element stopper element of the second embodiment.
Figure 8:
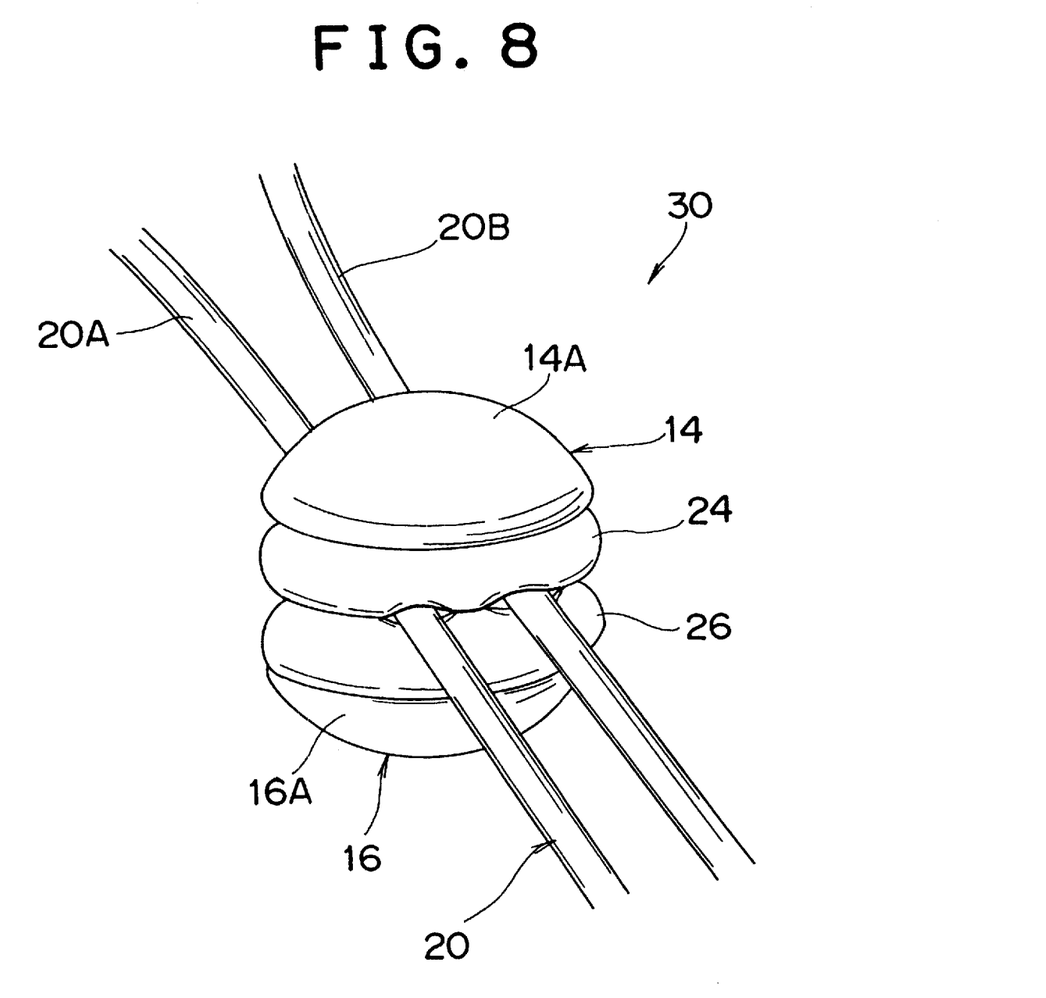
FIG. 8 is an overall diagonal view of the accessory-chain/string element stopper element of the second embodiment showing a usage of the element.

An accessory-chain/string stopper 30 of another preferred embodiment is shown in FIG. 7 and FIG. 8. Here, the structures in common with those in the accessory-chain stopper 10 of the first embodiment are indicated by identical numbers and descriptions of such structures are omitted.

As shown in FIG. 7 a first central body portion 34 and a second central body portion 36 are provided between the first decoration side portion 14 and the second decoration side portion 16 of the stopper body 32 of the accessory-chain/string stopper 30. Both the first body portion 34 and the second body portion 36 have a hole 22 through the body portions, respectively. As a result, as shown in FIG. 8, by inserting an end 20A of the strand 20 through the hole 22 of the first body portion 34 and by inserting another end 20B of the strand 20 through the hole 22 of the second body portion 36, adjustment of each individual end is enabled.

Figure 9:
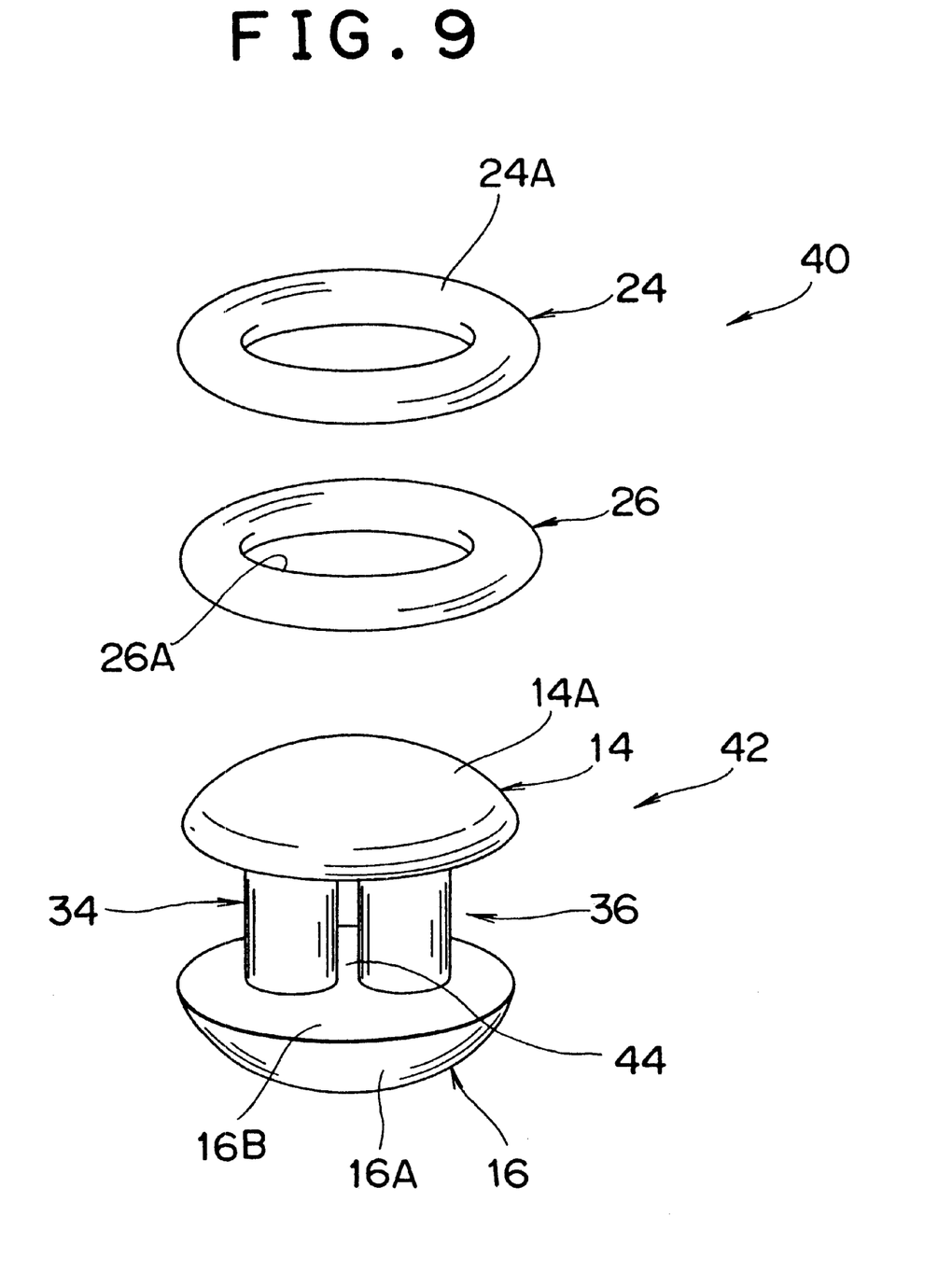
FIG. 9 is a fractional diagonal view of the accessory-chain/string element stopper of the third embodiment.

Another embodiment of the present invention is shown in FIG. 9. A detailed description of the features in common with the previous embodiments are omitted for the sake of brevity. Here, instead of a central post between the outer sides, a pair of spaced posts 34 may be provided to define an opening 44.

Although the stopper bodies 12, 32, 42 are preferably formed from gold alloy in the embodiments disclosed, which is a precious metal, it is apparent that the present invention is not limited to gold alloies, and silver alloy, platinum alloy and other materials may be used. In addition, although accessory-chain/string element stoppers 10, 30, 40 are applied to a necklace chain 20, it is also apparent that applications shall not be limited to necklace chains, and the present invention may be applied to bracelets or string elements. Although the first ring-like elastic element 24 and second ring-like element 26 are formed from silicon rubber having elasticity in the preferred embodiments, it is also apparent that other materials having elasticity may be used. In addition, although the body portion 18, the first body portion 34 and second body portion 36 are formed in round shapes in the preferred embodiments, the shape is not limited to such shapes. Although each of the body portions 18, the first body portion 34 and the second body portion 36 has an insertion through hole 22 in the preferred embodiments, it is also apparent that a number of insertion holes may be provided on the body portion 18, the first body portion 34 and the second body portion 36.

What is claimed is:

1. A stopper for allowing the adjustment of length of a flexible strand of a jewelry article, said stopper comprising a pair of spaced side portions, a central element member connected between the side portions, said side portions and central element defining a continuous groove between the side members around the central element, at least one aperture through said central element, at least one flexible strand passing through said aperture, and at least one elastic member disposed said central element between said side members with said continuous groove, said elastic member serving to releasably lock the flexible strand.

2. The stopper of claim 1 wherein said elastic member is substantially ring shaped.

3. The stopper of claim 1 wherein said elastic member comprises a pair of rings disposed in the groove, with the rings resiliently pressing against each other, and the flexible strand passing between said pair of rings.

4. The stopper of claim 1 wherein said central element comprises a cylindrical element secured between the side members and holding said members in a spaced relationship.

5. The stopper of claim 1 wherein said central element comprises a pair of spaced elements secured between said side member.

6. The stopper of claim 1 wherein said side members and central element members are of a one-piece construction.

7. The stopper of claim 1 wherein said elastic member is removable from and insertable into said groove.

* * * * *

UNITED STATES PATENT AND TRADEMARK OFFICE
CERTIFICATE OF CORRECTION

PATENT NO.    : 6,449,810 B1                                         Page 1 of 1
DATED         : September 17, 2002
INVENTOR(S)   : Yukihiro Kuwayama It is certified that error appears in the above-identified patent and that said Letters Patent is hereby corrected as shown below:

Column 4,
Line 43, delete "member" after "element"
Line 65, delete "members" after "element"

Signed and Sealed this

Tenth Day of December, 2002

JAMES E. ROGAN
*Director of the United States Patent and Trademark Office*